Patented Aug. 16, 1949

2,479,450

UNITED STATES PATENT OFFICE 2,479,450

CHEMICAL PROCESS FOR TRIPOLYMERS

David W. Young, Roselle, and William J. Sparks, Cranford, N. J., assignors to Standard Oil Development Company, a corporation of Delaware No Drawing. Application December 30, 1944, Serial No. 570,748

12 Claims. (Cl. 260—80.7)

This application relates to low temperature olefinic polymers; relates especially to low temperature tripolymers containing isobutylene, a diolefin, and a styrene; and relates particularly to a tripolymer of chloro styrene with isobutylene and a poly olefin.

It has been found possible to prepare polymers of relatively very high molecular weight by treatment at low temperature, below 0° C., with Friedel-Crafts type catalyst substances, preferably in solution, and polymers, copolymers and even tripolymers have been prepared by this procedure. However, the solubilities of the resulting polymers are of relatively limited range and of undesirably limited character.

The present invention provides a polymer which is (when cured) relatively insoluble in the hydrocarbons and shows (when uncured) a substantial solubility in mineral oil and various other solvents such as benzene, toluene, linseed oil, etc. The tripolymer, in addition, has a substantial amount of elasticity, is curable with sulfur and analogous curing agents, and shows a relatively high modulus. The tripolymer is conveniently prepared by mixing together the chlorine-substituted, or other halogen-substituted, styrene substance with isobutylene and a poly olefin and polymerizing the mixture at a temperature below 0° C. by application thereto of a Friedel-Crafts type catalyst such as boron trifluoride, titanium tetrachloride, or preferably aluminum chloride in solution in low-freezing, non-complex-forming solvents such as ethyl or methyl chloride or the like.

The resulting polymer, in addition to showing excellent physical properties alone, and improved properties when cured, is compatible with a wide range of other substances. The tripolymer is compatible with, and may be admixed with, or compounded with such substances as polyisobutylene (Vistanex), caoutchouc (natural rubber), the emulsion interpolymer of butadiene and styrene (Buna S), the interpolymer of butadiene and acrylonitrile (Perbunan), the low temperature interpolymer of isobutylene and a polyolefin (butyl), polyethylene (Polythene), polychloroprene (neoprene or Duprene) the condensation product derived from dichlorethylene and sodium polysulfide; factice (sulfonated corn oil), the "ethylene diamine-dimer acid polymer," resins containing nitrogen or oxygen, or both, including substantially all of the varnish, paint and lacquer resins as well as linseed oil, polyvinyl chloride, vinylidene chloride polymers (Saran) as well as a wide range of inert fillers such as carbon black, zinc oxide, magnesium oxide, aluminum oxide including clay, talc, and the like, pigments such as chrome green, chrome yellow, vermilion and substantially all of the paint pigments and lakes. In addition, the powdered metals such as aluminum powder, copper powder, lead powder and the like, are also compatible with, and admixable with the tripolymer. In addition, the tripolymer can be cured in the presence of substantially all of these substances, some of the rubber-like substances which are curable alone also being curable at the same time, in admixture with the tripolymer.

Thus the invention polymerizes together a chloro styrene, an iso olefin, and a poly olefin at low temperature to yield a high molecular weight tripolymer which is solid, elastic, curable with sulfur and of relatively decreased solubility in oils and solubility in certain of the relatively high molecular weight oxygenated solvents, such as di n-amyl ether. Also, when the percent of chlorinated styrene in the tripolymer is more than 50%, it is soluble, before curing, in methyl ethyl ketone. Other objects and details of the invention will be apparent from the following description:

The raw materials for the present invention consist first of a halogen-substituted styrene type compound such as p-Cl styrene or 2-5 di chloro styrene, which is a desirable material, or of 2-5 di chloro alpha methyl styrene, or of 2-5 di chloro alpha methyl para methyl styrene or of 2-5 di chloro alpha ethyl para ethyl styrene or the like. These are the preferred substances for the styrene type compound. However, other alkyl substituents up to 5 or 6 carbon atoms may be present in the alpha position; other substituents up to 5 or 6 carbon atoms may be present on the benzene ring in any desired position, and 1 or more halogen substituents up to 5 may be present in the benzene ring in any desired location. Alternatively, various alkyl substituents may be present in the omega position, although these are less desirable because of the greater difficulty of polymerization. Similarly, other halogens may be substituted including fluorine, bromine, and iodine, and they may be present on the benzene ring or on the ethylene substituent.

For the second component, isobutylene is the preferred substance, although various other iso olefins may in some instances be used, including such substances as 2 methyl butene 1 or 2 methyl pentene 1 or 2 methyl hexene 1 or the like. However, these higher compounds are less easily polymerizable and are, therefore, less desirable.

For the third component, any poly olefin having from 4 to 12 or 14 carbon atoms per molecule may be used, including such substances as butadiene, isoprene, piperylene, dimethyl butadiene, diethyl butadiene, dipropyl butadiene, dimethallyl, myrcene, and the like.

The three component mixture prepared from these substances may contain from 1% to approximately 90% of any one or two components. About the minimum amount of the chloro substituted styrene which yields a significant physical difference over prior compounds is 10%. However, smaller quantities to amounts as low as 1%, may have a marked effect upon both the physical and chemical properties of the tripolymer when the functional reactions of the aromatic or halogen group are involved. As little as 1% of isobutylene or a poly olefin effects a significant change in the properties of the resulting tripolymer as compared to the simple polymer of styrene or of chloro styrene or of styrene or chloro styrene with isobutylene or with the polyolefin. The preferred range utilizes the halo styrene within the proportion of from 1 to 60 to 70%, isobutylene, from 20% to 98%, and the poly olefin, from 1% to 30%.

The mixture, after mixing, or during the course of the mixing, is cooled to a temperature below 0° C., preferably within the range between −40° C. and −164° C. (Lower temperatures are usable but are less satisfactory because of the difficulty of obtaining them and the difficulty of working at such low temperatures, even the temperature of liquid nitrogen or liquid air is usable for some reactions.)

The cooling may be obtained by a refrigerating jacket upon the reactor or the mixing container; in which instances any desired refrigerant may be used under any desired pressure conditions to obtain the desired boiling point either pressure or vacuum being effective depending upon the refrigerant used and the desired temperature. Alternatively, internal refrigeration may be used, such substances as liquid propane, liquid ethane, liquid ethylene, or even liquid methane being usable; and in addition, liquid or solid carbon dioxide being useful. The preferred internal refrigerants are solid carbon dioxide, liquid ethane, and liquid ethylene giving temperatures of −78° C., −88° C., and −103° C.

There may be present also appropriate diluents such as higher boiling hydrocarbons including butane, pentane, hexane, heptane, and the like, which are inert in the reaction and serve merely as diluent dissolvents. There may also be present various of the mono or poly halo alkyl substances including ethyl, methyl, propyl, and butyl chloride and in addition the di chlorides, tri chlorides, tetra chlorides, and the like of the lower aliphatic compounds up to 6 or 7 carbon atoms. Likewise, the corresponding fluorides, bromides, and iodides may be used, depending upon their freezing points and the presence or absence of other low-freezing diluents. It is only necessary that the mixture be liquid at the polymerization temperature, and free from any tendency to inactivate the catalyst or form complexes therewith.

For the catalyst, the preferred catalysts are boron trifluoride, aluminum chloride, and titanium tetrachloride. Boron trifluoride and titanium tetrachloride may be used directly by the direct addition to the reaction mixture. Aluminum chloride is preferably used in solution in a low-freezing non-complex-forming solvent and the other catalysts are also conveniently usable in solution in an appropriate catalyst solvent.

For the Friedel-Crafts catalyst, any of the Friedel-Crafts catalysts pointed out by N. O. Calloway in his article on "The Friedel-Crafts synthesis," printed in the issue of "Chemical Reviews" published by the American Chemical Society at Baltimore in 1935, Volume XVII, No. 3, the article beginning on page 327, the list being particularly well shown on page 375, may be used. All of these catalysts may be used in solution in a low-freezing non-complex-forming solvent or the liquid and gaseous ones may be used directly.

For the catalyst solvent, particularly useful substances are the lower alkyl halides such as ethyl and methyl chloride or ethylene di chloride or chloroform or the like; any of the lower paraffinic hydrocarbons up to 4 or 5 carbon atoms with one or more halogen substituents may also be used. With some of the metal halide catalysts, particularly boron trifluoride, aluminum bromide, and double salts of aluminum with both chlorine and bromine, the lower hydrocarbons such as ethylene, ethane, propane, butane, pentane, hexane, and the like up to 8 or 10 carbon atoms are also usable and useful catalyst solvents since they have a freezing point below 0° C., thereby being low freezing and volatilized away from the dissolved catalyst with not over 1 or 2° elevation of the boiling point over the boiling point of the pure liquid, thereby being noncomplex forming.

The catalyst if gaseous may merely be bubbled through the reaction mixture at the desired temperature. If liquid air solution, the catalyst is conveniently applied in the form of a finely divided spray on to the surface of the rapidly stirred olefinic mixture. Alternatively, a liquid catalyst may be applied in the form of a fine jet into the body of the rapidly stirred, cold olefinic material.

The polymerization proceeds more or less rapidly according to the catalyst used. With aluminum chloride, the polymerization reaction may be instantaneous, and too rapid to measure a time delay. With other catalysts such as aluminum bromide in hydrocarbon solvents, the reaction may be much slower, taking from minutes to hours for completion.

When the reaction has reached the desired stage, the resulting solid polymer is separated from the cold reaction mixture in any desired way such as by dumping the whole reaction mixture into warm water or into warm hydrogen solvent or into warm solvent containing an alcohol to inactivate the catalyst, or the like.

With some solvents, the polymer may remain in solution, particularly if the isobutylene content is high, and especially when such diluents as carbon disulfide or petroleum hydrocarbons are used, in which case the polymer is desirably precipitated from solution by the addition of substantial quantities of an oxygenated organic liquid such as an alcohol of from 1 to 20 carbon atoms or a similar ether, ester, ketone, or the like. Alternatively, the mixture may be allowed merely to "weather" until the low boiling components are volatilized out. (If the mixture is allowed to "weather" and the percent halogenated styrene in the tri polymer is above 40% by analysis, a plastic foam is obtained that has value as a semi-rigid insulating material.)

The polymer is then preferably placed on the open roll mill and washed with water to remove as much as possible of residual traces of catalyst and to volatilize out as much as possible of the dissolved or occluded refrigerants, diluents, solvents, and the like.

The resulting polymer may be used as such, or it may be compounded with sulfur, preferably in the presence of a sulfurization aid such as Tuads (tetramethyl thiuram disulfide), Captax (mercaptobenzothiazole) or Monex (tetramethyl thiuram monosulfide) or the like. Alternatively, the material may be compounded and cured with para quinone dioxime and its esters or metal salt substituents or analogues and homologues; or with the dinitroso compounds generally.

A suitable compounding formula for the polymer is:

| | | |
|---|---|---|
| Tripolymer | parts by weight | 100 |
| Stearic acid | parts | 0 to 10 |
| Zinc oxide | do | 0 to 10 |
| Sulfur | do | 1 to 5 |
| Tuads | do | 1 to 3 |
| Carbon black | do | 10 to 200 |

This compound is conveniently prepared either on the open roll mill or in the Banbury type mixer or the like and may be cured in a closed mold, or under a fabric wrapping at temperatures ranging from 235° F. to 350° F. for time intervals ranging from 5 minutes to 240 minutes to yield a cured material having a tensile strength ranging from 500# to 4000# per square inch and an elongation at break ranging from 50% to 1000%.

EXAMPLE 1

A mixture was prepared consisting of 500 parts by weight of ethyl chloride with 250 parts by weight of 2-5 di chloro styrene, 300 parts by weight of pulverized $CO_2$, 250 parts by weight of liquid isobutylene, and 13 parts by weight of isoprene. The chloro styrene had a purity of approximately 95%, the isobutylene, of approximately 98%, and the isoprene, of approximately 96%. The solid $CO_2$ cooled the mixture to a temperature of −78° C. To the cold mixture there was then added 220 parts by weight of a solution of aluminum chloride in methyl chloride in the concentration of 0.83 gram of $AlCl_3$ per 100 grams of methyl chloride. The olefinic mixture was stirred vigorously and the catalyst was added slowly in the form of a fine spray on to the surface of the stirred olefinic mixture. After ten minutes, approximately 38 parts by weight of isopropyl alcohol was added to the mixture to inactivate the catalyst. The polymer was strained from the liquid residue and heated to a temperature of approximately 150° F. for an hour to drive out as much as possible of the solvent and unpolymerized materials.

The yield was approximately 82% of the olefinic material in the original polymerization mixture and the polymer had a molecular weight, or Staudinger number, of approximately 2300.

The Mooney plasticity at 212° F. was 35.

A portion of the tripolymer was compounded according to the following recipe:

| | | |
|---|---|---|
| Tripolymer | parts by weight | 100 |
| Stearic acid | do | 5 |
| Zinc oxide | do | 5 |
| Carbon black (Cabot #9) | parts | 50 |
| Sulfur | do | 3 |
| Tuads | do | 1 |

A portion of this material was cured at 307° F. for 40 minutes and was found after curing to have a tensile strength of 1950# per square inch, an elongation at break of 500% and a modulus at 300% elongation of 1030# per square inch.

The product was not soluble and showed only minor swelling after 48 hours' submersion at 25° C. in a high grade of mineral oil (Barosa 43) (an oil with a viscosity index of 112 and 43 S. S. U. of 210° F.).

EXAMPLE 2

A series of polymerizations were conducted using a variety of catalysts, a variety of catalyst concentrations, a variety of polymerization temperatures, and a variety of olefinic materials as shown in the following table. A considerable range of Mooney plasticities were obtained and a considerable range of tensile strengths, elongations at break and moduli after various curing temperatures.

*Table*

| Run No. | Type of Catalyst | Conc. of Catalyst per 100 ml. of MeCl Catalyst Solution | Temperature of Polymerization Reaction | Volume of MeCl per Vol. of Active Olefin Feed | Type of Active Feed | | |
|---|---|---|---|---|---|---|---|
| | | | | | Per cent p-Cl styrene | Per cent Isoprene | Per cent Isobutylene |
| | | | °C. | | | | |
| 1 | $AlCl_3$ in MeCl | 0.35 | −103 | 2 | 0 | 3 | 97 |
| 2 | do | 0.35 | −103 | 2 | 3 | 3 | 94 |
| 3 | do | 0.35 | −103 | 2 | 5 | 3 | 92 |
| 4 | do | 0.50 | −103 | 2 | 10 | 3 | 87 |
| | | | | | Per cent p-Br Styrene | Per cent Isoprene | Per cent Isobutylene |
| 5 | $AlCl_3$ in MeCl | 0.50 | −103 | 2 | 10 | 3 | 87 |
| 6 | do | 0.50 | −103 | 2 | 10 | 3 | 87 |
| | | | | | Per cent p-Br Styrene | 2-3 Dimethyl Butadiene 1-3 | Per cent Isobutylene |
| 7 | $BF_3$ in MeCl | 0.85 | −103 | 2 | 0 | 1.5 | 98.5 |
| 8 | do | 0.85 | −103 | 2 | 5 | 1.5 | 93.5 |
| 9 | $AlCl_3$ in MeCl | 0.55 | −89 | 2 | 0 | 1.5 | 98.5 |
| 10 | do | 0.55 | −89 | 2 | 20 | 1.5 | 78.5 |
| | | | | | Per cent p-Br Styrene | Per cent Myrcene | Per cent Isobutylene |
| 11 | $AlBr_3$ in MeCl | 1.12 | −101 | 2 | 0 | 3 | 97 |
| 12 | do | 1.12 | −101 | 2 | 20 | 3 | 77 |
| | | | | | Per cent p-Cl Styrene | Per cent Butadiene | Per cent Isobutylene |
| 13 | $AlCl_3$ in MeCl | 0.80 | −101 | 2 | 0 | 5 | 95 |
| 14 | do | 0.80 | −101 | 2 | 50 | 5 | 45 |
| 15 | $AlCl_3$.$AlBr_2Cl$ in MeCl | 0.80 | −109 | 2 | 35 | 1 | 64 |

Table—Continued

| Run No. | Mooney at 212° 5′ min. | 50 Pt. Cabot #9 Cure at— | | |
|---|---|---|---|---|
| | | Tensile lbs./sq. in., Mod. at 300%, Elongation Percent, 20′ | Tensile, lbs./sq. in., Mod. at 300%, Elongation Percent, 40′ | Tensile lbs./sq. in., Mod. at 300%, Elongation Percent, 60′ |
| 1 | 56 | 2600—405—900 | 2750—485—825 | 2860—575—750 |
| 2 | 52 | 2550—455—880 | 2820—560—900 | 2860—630—740 |
| 3 | 54 | 2660—525—800 | 2800—610—810 | 2810—650—730 |
| 4 | 41 | 2500—710—795 | 2700—645—790 | 2810—948—720 |
| 5 | 42 | 2700—850—850 | 2950—900—770 | 3100—1050—600 |
| 6 | 44 | 2710—860—840 | 2940—910—760 | 3110—1020—610 |
| 7 | 74 | 2500—240—980 | 3120—420—810 | 3120—420—750 |
| 8 | 62 | 2520—410—880 | 2870—550—720 | 2860—610—740 |
| 9 | 52 | 2200—260—1050 | | |
| 10 | Not Det | 2160—775—620 | | |
| 11 | 32 | 2100—480—990 | | |
| 12 | 34 | 2000—820—780 | | |
| 13 | 66 | 2200—240—1100 | | |
| 14 | Not Det | Solid resin | | |
| 15 | Not Det | Solid resin | | |

These results show the very valuable properties of a wide range of these polymers (items Nos. 1, 9, 11 and 13 are comparison runs to show the effect of the absence of the chloro styrene). From the above examples it will be seen that the invention covers specifically the use of 45 to 94% by weight of a mono-isoolefin, preferably isobutylene, and 1 to 5% of a multi-olefin having 4 to 10 carbon atoms, such as isoprene, butadiene, and the like, and about 3 to 50% of a styrene having 1 to 2 chlorine atoms nuclearly substituted therein.

Thus the process of the invention polymerizes together at low temperature a chloro styrene with an iso olefin and a poly olefin to yield a solid high molecular weight polymer capable of curing with sulfur to yield an elastic material of good strength. The polymer has value in the preparation of auto tires, etc.

While there are above disclosed but a limited number of embodiments of the invention, it is possible to provide still other embodiments without departing from the inventive concept herein disclosed, and it is, therefore, desired that only such limitations be imposed upon the appended claims as are stated therein or required by the prior art.

The invention claimed is:

1. The process for preparing a solid, plastic, non-hydrocarbon interpolymer, comprising the steps of reacting together from 45 to 94% of isobutylene, from 1% to 5% of a multi-olefin having from 4 to 10 inclusive carbon atoms per molecule, and from 3 to 50% of a chlorinated styrene having 1 to 2 chlorine atoms on the ring, at a temperature within the range between −40° C. and −164° C. in the presence of a polymerization catalyst comprising a Friedel-Crafts active metal halide catalyst in solution in a low-freezing non-complex-forming solvent which is liquid at the reaction temperature.

2. The process for preparing a solid, plastic, non-hydrocarbon interpolymer, comprising the steps of reacting together from 45 to 94% of isobutylene, from 1% to 5% of a multi-olefin having from 4 to 10 inclusive carbon atoms per molecule, and from 3 to 50% of chlorinated styrene having 1 to 2 chlorine atoms on the nucleus, at a temperature within the range between −40° C. and −164° C. in the presence of a polymerization catalyst comprising aluminum chloride in solution in methyl chloride.

3. The process for preparing a solid, plastic, non-hydrocarbon interpolymer, comprising the steps of reacting together from 45 to 94% of isobutylene, from 1% to 5% of a multi-olefin having from 4 to 10 inclusive carbon atoms per molecule, and from 3 to 50% of 2-5-di-chloro styrene, at a temperature within the range between −40° C. and −164° C. in the presence of a polymerization catalyst comprising aluminum chloride in methyl chloride.

4. The process for preparing a solid, plastic, non-hydrocarbon interpolymer, comprising the steps of reacting together from 45 to 94% of isobutylene, from 1% to 5% of isoprene, and from 3 to 50% of a halogen substituted styrene having the halogen on the ring, at a temperature within the range between −40° C. and −164° C. in the presence of a polymerization catalyst comprising a Friedel-Crafts active metal halide catalyst in solution in a low-freezing non-complex-forming solvent which is liquid at the reaction temperature.

5. The process for preparing a solid, plastic, non-hydrocarbon interpolymer, comprising the steps of reacting together from 45 to 94% of isobutylene, from 1% to 5% of isoprene, and from 3 to 50% of para chloro styrene, at a temperature within the range between −40° C. and −164° C. in the presence of a polymerization catalyst comprising a Friedel-Crafts active metal halide catalyst in solution in a low-freezing non-complex-forming solvent which is liquid at the reaction temperature.

6. The process for preparing a solid, plastic, non-hydrocarbon interpolymer, comprising the steps of reacting together from 45 to 94% of isobutylene, from 1% to 5% of isoprene, and from 3 to 50% of 2-5-di chloro styrene, at a temperature within the range between −40° C. and −164° C. in the presence of a polymerization catalyst comprising a Friedel-Crafts active metal halide catalyst in solution in a low-freezing non-complex-forming solvent which is liquid at the reaction temperature.

7. The process for preparing a solid, plastic, non-hydrocarbon interpolymer, comprising the steps of reacting together from 45 to 94% of isobutylene, from 1% to 5% of butadiene, and from 3 to 50% of a chlorinated styrene having 1 to 2 chlorine atoms on the nucleus, at a temperature within the range between −40° C. and −164° C. in the presence of a polymerization catalyst comprising aluminum chloride in solution in ethyl chloride.

8. A synthetic, solid, plastic, non-hydrocarbon interpolymer containing co-polymerized thereinto from 45 to 94% of isobutylene, from 1% to 5% of a multi-olefin, having from 4 to 10 carbon atoms per molecule, and from 3 to 50% of a halogen substituted styrene having the halogen on the ring, the interpolymer being characterized by reactivity with sulphur to yield an elastic product, said monomers being polymerized at a temperature between −40° C. and −164° C. in the presence of a Friedel-Crafts active metal halide catalyst dissolved in a non-complex forming solvent which is liquid at the reaction temperature.

9. A synthetic, solid, plastic, non-hydrocarbon interpolymer containing co-polymerized thereinto from 45 to 94% of isobutylene, from 1% to 5% of isoprene, and from 3 to 50% of a halogen substituted styrene having the halogen on the ring, the interpolymer being characterized by reactivity with sulphur to yield an elastic product, said monomers being polymerized at a temperature between −40° C. and −164° C. in the presence of a Friedel-Crafts active metal halide catalyst dissolved in a non-complex forming solvent which is liquid at the reaction temperature.

10. A synthetic, solid, plastic, non-hydrocarbon interpolymer containing co-polymerized thereinto from 45 to 94% of isobutylene, from 1% to 5% of butadiene, and from 3 to 50% of a halogen substituted styrene having the halogen on the ring, the interpolymer being characterized by reactivity with sulphur to yield an elastic product, said monomers being polymerized at a temperature between −40° C. and −164° C. in the presence of a Friedel-Crafts active metal halide catalyst dissolved in a non-complex forming solvent which is liquid at the reaction temperature.

11. A synthetic, solid, plastic, non-hydrocarbon interpolymer containing co-polymerized thereinto from 45 to 94% of isobutylene, from 1% to 5% of isoprene, and from 3 to 50% of a para chloro styrene, the interpolymer being characterized by reactivity with sulphur to yield an elastic product, said monomers being polymerized at a temperature between −40° C. and −164° C. in the presence of a Friedel-Crafts active metal halide catalyst dissolved in a non-complex forming solvent which is liquid at the reaction temperature.

12. A synthetic, solid, plastic, non-hydrocarbon interpolymer containing co-polymerized thereinto from 45 to 94% of isobutylene, from 1% to 5% of isoprene, and from 3 to 50% of 2-5-dichloro styrene, the interpolymer being characterized by reactivity with sulphur to yield an elastic product, said monomers being polymerized at a temperature between −40° C. and −164° C. in the presence of a Friedel-Crafts active metal halide catalyst dissolved in a non-complex forming solvent which is liquid at the reaction temperature.

DAVID W. YOUNG.
WILLIAM J. SPARKS.

REFERENCES CITED

The following references are of record in the file of this patent:

UNITED STATES PATENTS

| Number | Name | Date |
|---|---|---|
| 2,366,328 | Fryling | Jan. 2, 1945 |
| 2,406,319 | Brooks et al. | Aug. 27, 1946 |
| 2,438,340 | Johnson | Mar. 23, 1948 |

FOREIGN PATENTS

| Number | Country | Date |
|---|---|---|
| 106,371 | Australia | Jan. 10, 1939 |
| 115,688 | Australia | Aug. 6, 1942 |
| 387,381 | Great Britain | Feb. 6, 1933 |

OTHER REFERENCES

Michalek: pages 1559–1563, Chem. and Eng. News, Sept. 25, 1944.